United States Patent
Baird et al.

(10) Patent No.: US 10,143,326 B2
(45) Date of Patent: Dec. 4, 2018

(54) DEVICE FOR COOKING WITH A COMBINATION OF STEAM AND SMOKE

(76) Inventors: Ronald H. Baird, Ogden, UT (US); Thomas R. McKenzie, Santa Fe Springs, CA (US)

( * ) Notice: Subject to any disclaimer, the term of this patent is extended or adjusted under 35 U.S.C. 154(b) by 1291 days.

(21) Appl. No.: 12/957,328

(22) Filed: Nov. 30, 2010

(65) Prior Publication Data

US 2012/0132082 A1     May 31, 2012

(51) Int. Cl.
*A47J 36/00*     (2006.01)
*A47J 27/04*     (2006.01)

(52) U.S. Cl.
CPC .......... *A47J 27/04* (2013.01); *A47J 2027/043* (2013.01)

(58) Field of Classification Search
CPC .................. A47J 27/04; A47J 2027/043; A47J 2027/046; A47J 27/05
USPC ....... 99/482, 417, 467, 339; 126/369, 377.1, 126/348, 369.1, 369.2; 219/399, 482, 401
See application file for complete search history.

(56) References Cited

U.S. PATENT DOCUMENTS

| | | | | |
|---|---|---|---|---|
| 4,913,039 A | * | 4/1990 | Sutphen | 99/339 |
| 5,611,264 A | * | 3/1997 | Studer | 99/340 |
| 6,098,527 A | * | 8/2000 | Chang | 99/330 |
| 6,431,164 B1 | * | 8/2002 | Wardell | 126/5 |

* cited by examiner

*Primary Examiner* — Tu B Hoang
*Assistant Examiner* — Diallo I Duniver
(74) *Attorney, Agent, or Firm* — Fehr Law Firm; Thompson E. Fehr

(57) ABSTRACT

A device for cooking with a combination of steam and smoke. This device employs a burner for heating a material to create smoke, a container to hold such material; a water pan to catch drippings and also having an aperture to direct the flow of the smoke; a tapered pipe having its inlet attached to a water pan with a taper of a pipe accelerating speed of flowing smoke; optionally, a substantially flat plate at an exit of a tapered pipe to cause the smoke to spread farther from a center of its flow through optional apertures in a tapered pipe; optionally, fins attached to an exit in order to cause smoke to rotate as it rises; and apertures in a steam tube for injecting steam into an intended path of smoke.

30 Claims, 10 Drawing Sheets

DEVICE FOR COOKING WITH A COMBINATION OF STEAM AND SMOKE

BACKGROUND OF THE INVENTION

Field of the Invention

This invention relates a device for utilizing smoke and steam to cook food.

Description of the Related Art

A number of devices have utilized steam, smoke, or both in relation to food.

The Pressure Cooking and Smoking Apparatus of U.S. Pat. No. 4,469,020 employs smoke but no steam; and the food is heated by a source other than that which produces the smoke. In an alternate embodiment, though, the smoke can be filtered through water which may contain "flavoring elements" to "to impart certain flavors" to the food that is being cooked.

The Mini-kitchen which is the subject of U.S. Pat. No. 4,672,944, does the reverse, utilizing steam but no intentional smoke. A grill chamber burns charcoal in its bottom and employs reflector plates to direct thermal radiation upwardly against and through the grill. Water flows downward form a plastic water tank having a releasable cap; through a copper tube around the grill chamber; and then, as steam, into the steam compartment, which is separate from the grill chamber. A water-level indicator is associated with the water tank.

Similarly, the Steamer Device for Cooking Food in a Grill of U.S. Pat. No. 5,501,142 generates steam but no intended smoke. A refillable container for water is placed above or proximate to the heating source under the grill. Optionally, flavored liquids can be put in the container to flavor the food.

The Convection Meat Cooker of U.S. Pat. No. 6,012,381 employs convection cooking; has no smoke; and uses moisture only to help cool and clean the Cooker after cooking has been completed.

In the Cocoshell Filtered Cold Smoke Apparatus of U.S. Pat. No. 6,681,686 material is electrically heated to produce smoke that is cooled and filtered before being stored as carbon oxide gas in a gas bottle ultimately to be used for smoking meat. Liquid is utilized only for cooling.

The Outdoor Multi-method Cooker of U.S. Pat. No. 7,156,087 does not use steam. An effect similar to the draw of a fireplace is used with various passageways to provide selective convection, radian, or conductive cooking or combinations thereof. Such cooking operations can be conducted either with or without smoke.

Within the Outdoor Cooking Machine of U.S. Pat. No. 7,159,509 cold smoking is accomplished by having food on a grill which is to the side of the direct flow of heat; hot smoking is achieved by having the grill directly in the flow of heat with "steaming" produced by an open container of water between the heat source and the grill. Heat and smoke is generated by fire in a firepan.

During the process for using the Steamer and Smoker Accessory for a Barbecue Grill of U.S. Pat. No. 7,469,630 steam is directed upward from exhausts in conduits with no other technique for mixing such steam with smoke generated by burners separate from those which create the steam. The container within which the steam is generated is pressurized so that it cannot be opened while being operated. Such container, can, however, hold a "marinating mixture." After grilling, steam can be utilized to "ease the task of cleaning the grill grate."

The Steam-generating Attachment for Barbecue of U.S. patent publication No. 2002/0077449 involves no intended smoke. A bottle with a removable cap supplies water from a location exterior to the barbecue which runs through a pipe that is located above the burner and below the grill on which food is placed of cooking. Steam escapes from perforations in the pipe.

In the Outdoor Cooker Having Improved Heat and Combustion Gas Controls of U.S. patent publication No. 2005/0217659 a grill contains a fire box which is sealed except for its top and which generates heat and smoke. The bottom section of the grill can be filled with water around the lower part of the fire box. Steam is, consequently, created when there is a fire in the fire box. The steam can be used for cooking or cleaning of the Cooker. A convection plate above the fire box uniformly transmits heat from the fire box to the food surface above the convection plate. But no means other means exist for mixing the steam and smoke.

And Chinese patent publication no. CN 101390706 concerns a Domestic Multifunctional High-temperature Electric Steaming Box. No smoke is involved. A steam cooking cabinet has separate compartments to avoid mixing flavors. There seem, from the drawings, to be two places where water is heated electrically to produce steam. The downstream heater appears to have coils for the water path at the same height as the reservoir so that the level of water being heated would be approximately the same as the level of the water in the reservoir.

BRIEF SUMMARY OF THE INVENTION

The Device for Cooking with Steam and Smoke of the present invention has a Venturi device, which is a tapered pipe, which is narrower at its exit, to accelerate the smoke, in accordance with the Bernoulli principle, to improve combining of steam with the smoke for better cooking and flavoring of the product. The Inventors are, as the cited prior art suggests, unaware of any earlier use of the Venturi device in a cooker involving smoke and steam.

Fins located near the exit of the pipe further aid the combining of the smoke with the steam by causing the smoke to rotate as it rises. Preferably, centered between the fins is a substantially flat plate which causes the smoke to spread farther from the center of its flow. Either the fins or the flat plate could be utilized alone to enhance the combining of the smoke and steam, but utilizing the flat plate with the fins most successfully combines the smoke and the steam.

In the preferred embodiment the steam is created in a separate steam generator that is preferably attached with a traditional quick connect coupling to a steam tube that proceeds inside the cabinet (where smoke is generated) above the fins but below one or more cooking grates for holding the product to be cooked. The steam tube has apertures located to direct steam into the intended path of the smoke, preferably upward; horizontally; or at an angle between vertical and horizontal, inclusive, (It would also be acceptable to have the steam escaping at various angles and to have the angles as great as 180 degrees from upward, i.e., downward) inside such cabinet for mixing with the smoke coming from the Venturi device through the fins. Preferably, the shape of the steam tube is cylindrical, although any shape that can allow the steam to escape into the intended path of the smoke is, as just indicated, acceptable.

In another embodiment a pan to which the bottom of the tapered pipe is attached is enlarged to hold water that is turned to steam by heat from the burner for creating the smoke. This steam goes upward and mixes with the smoke coming from the Venturi Device through the fins.

The preferred embodiment also has a reservoir which is intended to hold a liquid such as water for generating the steam and an openable top for, even during operation of the steam generator, adding the liquid, or adding flavoring to the liquid. Near the bottom of the reservoir, the reservoir is in fluid communication with the steam generator, near the bottom of the steam generator; and the bottom of the reservoir is at substantially the same level as the bottom of the steam generator, making the level of the water in the reservoir approximately the same as the level of the water in the steam generator. And, for easy disassembly, the tube through which the reservoir communicates with the steam generator is preferably attached to the tube from the steam generator with a traditional quick connect coupling.

DETAILED DESCRIPTION OF THE INVENTION

The Device for Cooking with Steam and Smoke utilizes, as indicated above, steam to aid smoke in cooking a product (preferably, food including, but not necessarily limited to, meat, fish, and the like).

Figure 1:
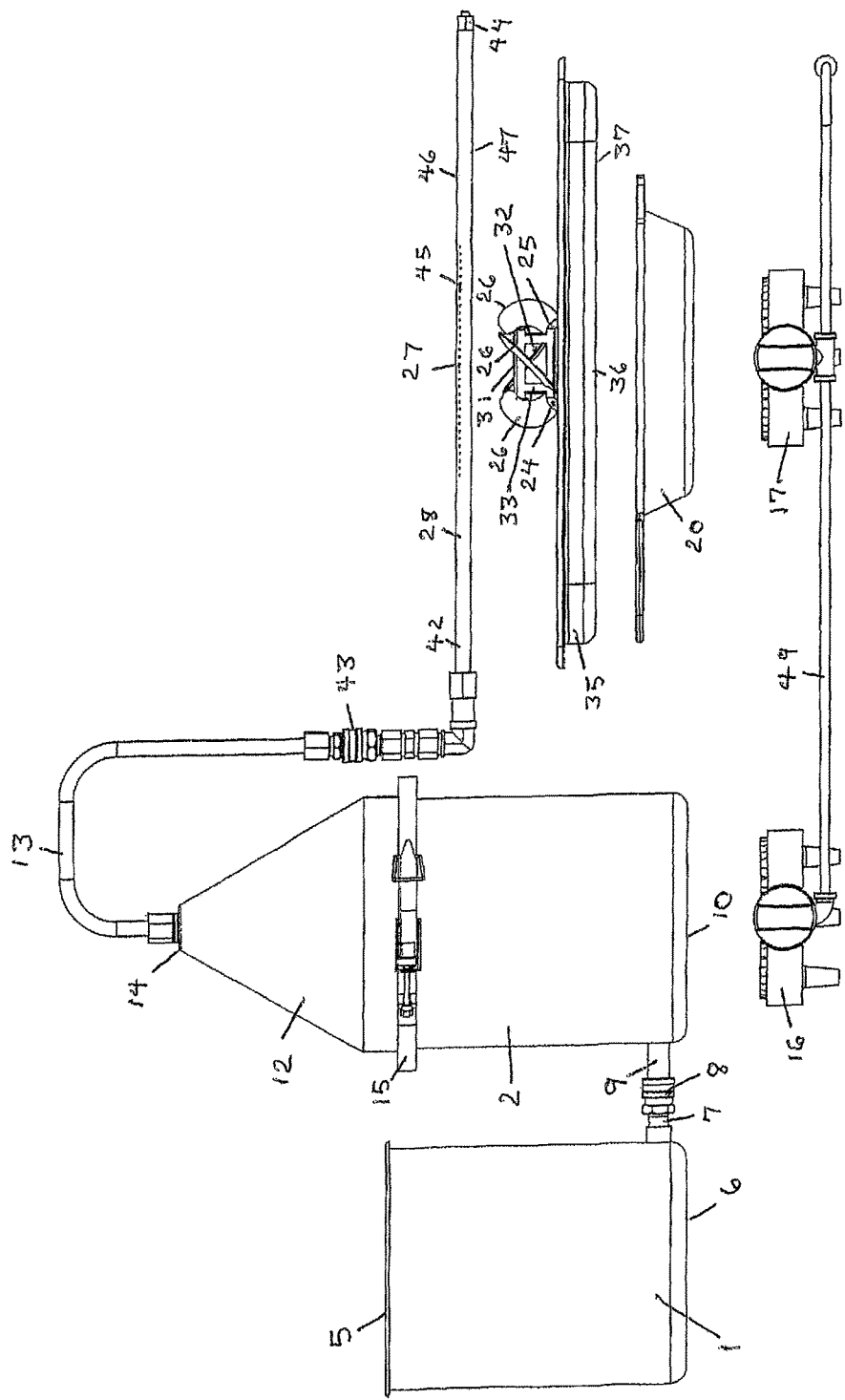
FIG. 1 shows the operational features of the Device for Cooking with Steam and Smoke.
Figure 2:
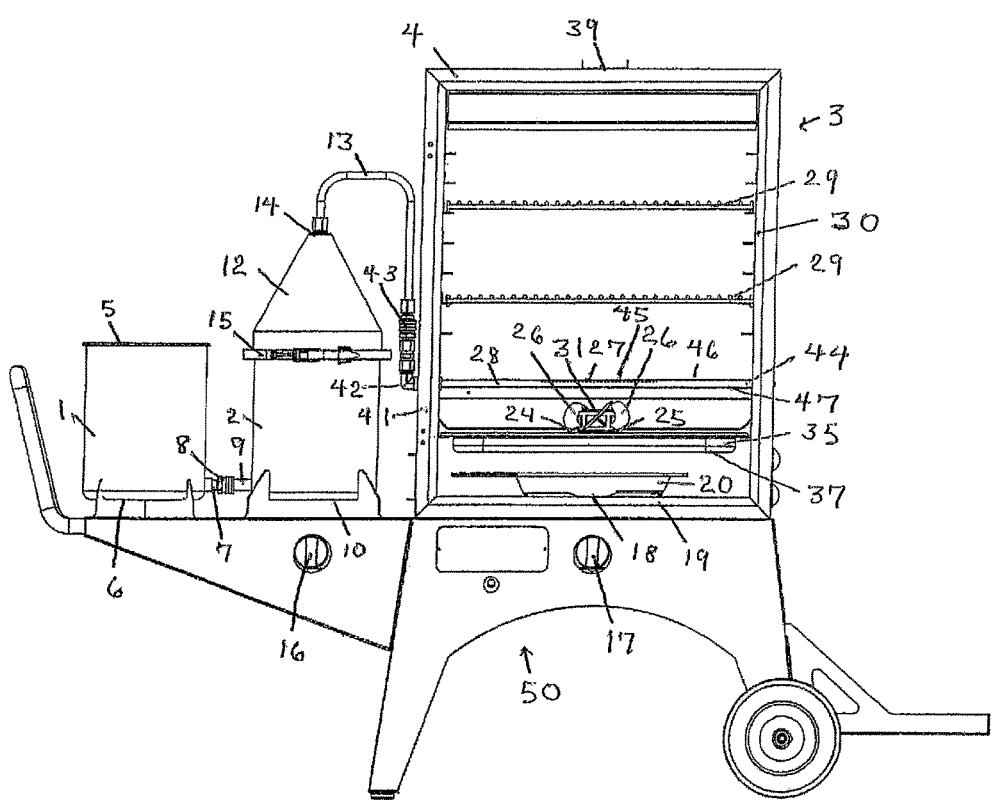
FIG. 2 illustrates the entire Device for Cooking with Steam and Smoke.

In the preferred there are, as seen in FIGS. 1 and 2, three basic components: a reservoir 1 for holding the liquid that generates steam; a steam generator 2 receiving water from the reservoir; and a treatment unit 3 comprising a temporarily sealable (i.e., openable) cabinet 4 within which the smoke is generated, combined with the steam, and utilized to treat the product. The openable reservoir 1, the steam generator 2, and the treatment unit 3 are all physically separate from one another.

The reservoir 1 is openable, preferably having an openable top 5 (or, alternatively, is permanently open); and, near the bottom 6 of the reservoir 1 the reservoir 1 is in fluid communication with the steam generator 2 through a pipe 7 that is attached, preferably releasably (and even more preferably, with a traditional quick connect 8), to a pipe 9 connected to the steam generator 2 near the bottom 10 of the steam generator 2. Therefore, since, the bottom 6 of the reservoir 1, is, as discussed above, also at substantially the same level as the bottom 10 of the steam generator 2, the level of water (or other liquid for generating steam) in the reservoir 1 is approximately the same as the level of the water in the steam generator 2. Having the reservoir 1 separated from the steam generator 2, thus, enables one to look into the reservoir 1 and determine the approximate level of water in the steam generator 2 and, when necessary, to add water to the reservoir 1 in order to avoid having the steam generator 2 run dry during use.

Figure 3:
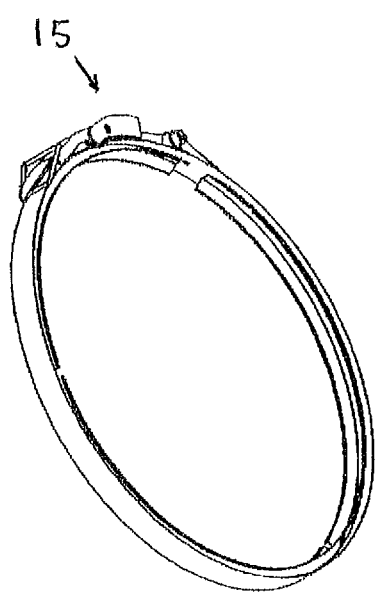
FIG. 3 is a perspective view of an aircraft-style quick connect clamp with a safety catch.

The steam generator 2 has a container 12 that is capable of holding liquids and gases. The steam generator 2 is in fluid communication with the cabinet 4, preferably using a pipe 13 attached to the container 12 of the steam generator 2 at a location higher than the highest intended level of liquid within the container 12 of the steam generator 2 and preferably at the top 14 of the container 12 of the steam generator 2. It is, in fact, the bottom 10 of the container 12 which is at substantially the same level as the bottom 6 of the reservoir 1.) The top 14 of the container 12 of the steam generator 2 is preferably conical. To facility cleaning, the steam generator 2 is preferably composed of two sections with the top 14 releasably connected to the bottom 10 preferably using an traditional aircraft-style quick connect clamp with a safety catch 15, as illustrated in FIG. 3, and a traditional silicon gasket. And a burner 16, which is preferably adjustable, is located below the container 12 in order to provide the heat for converting the liquid to steam. (And the pipe 9 connected to the steam generator 2 near the bottom 10 of the steam generator 11 is, logically, connected to the container 12.)

Figure 4:
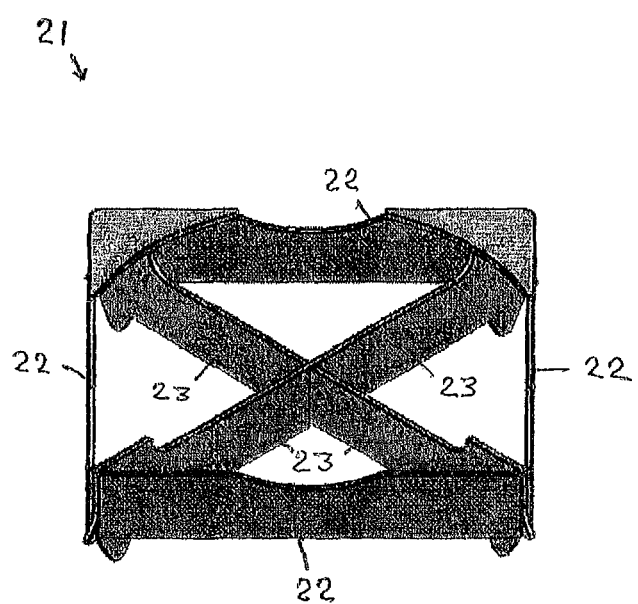
FIG. 4 displays an optional support to hold a container for a material such as wood chips to create smoke FIG. 5 portrays, attached to a water pan, the tapered pipe having a flat plate at the exit of the pipe and apertures through which the smoke flows near the exit of the pipe.

Another burner 17, which is preferably adjustable, is located below an aperture 18 in the bottom 19 of the cabinet 4. A container 20, which is preferably a pan, for a material such as wood chips to create smoke is situated above the bottom 19 of the cabinet 4 and is preferable wider than the aperture 18 in the bottom 19 of the cabinet 4. Although the container 20 can sit on the bottom 19 of the cabinet 4, preferably a support 21, as illustrated in FIG. 4, for the container 20 is attached to the bottom 19 of the cabinet 4. A side 22 (if the aperture 18 is oval or circular) or sides 22 of the support 21 surround the aperture 18; and, preferably, arms 23 of the support 21 cross the aperture 18 between the side or sides 22.

Figure 5:
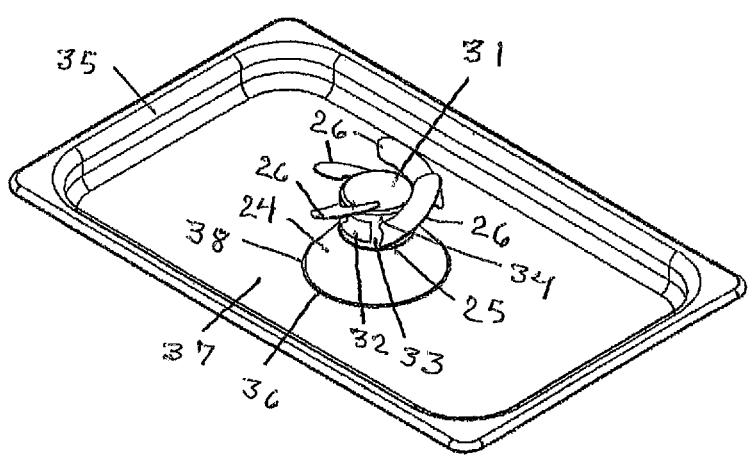

Despite the fact that a fan below the cabinet and ducting within the cabinet 4 could be utilized to mix the smoke and the steam, it is preferable to minimize moving parts. Consequently, within the cabinet 4 the smoke proceeds through a tapered pipe 24, shown most clearly in FIG. 5, which is narrower at its exit 25, to accelerate the smoke, in accordance with the Venturi effect and the Bernoulli principle, as indicated above, to improve combining of the steam with the smoke for better flavoring of the product. Two or more, preferably four, fins 26 located near the exit 25 of the tapered pipe 24 and attached to such exit 25 further aid, by causing the smoke to rotate as it rises, the combining of the smoke with the steam which is introduced through apertures 27 in a steam tube 28 that is in fluid communication with the container 12 the steam generator 2 and located above the exit 25 of the tapered pipe 24 but below the lowest grate 29 for holding the product to be smoked. (The grates 29 are substantially horizontally located within the cabinet 4 and attached, preferably removably, to the inside 30 of the cabinet 4.)

As discussed above, preferably centered between the fins 26 and attached to the exit 25 is a substantially flat plate 31 which causes the smoke to spread farther from the center of its flow. Either the fins 26 or the flat plate 31 could be utilized alone to enhance the combining of the smoke and steam, but utilizing the flat plate 31 with the fins 26 most successfully combines the smoke and the steam. When the flat plate 31 is utilized, apertures 32 in the side 33 (if the tapered pipe 24 has a cross section which is oval or circular) or sides 33 (The general term "perimeter" is used to encompass the side 33 or sides 33 of the tapered pipe 24 and, therefore, to apply whether the tapered pipe 24 has only one side 33 or multiple sides 33) of the tapered pipe 24 near the upper end 34 of the tapered pipe 24 serve as the route for smoke to leave the exit 25 of such tapered pipe 24.

In order to direct the smoke into the tapered pipe 24 a water pan 35 (which, as its name implies, also serves to capture dripping moisture) is located above the container 20 for the material which is heated to generate smoke but below the steam tube 28 and preferably extends across the entire inside 30 of the cabinet 4. An aperture 36 exists in the bottom 37 of the water pan 35 for the smoke. The side 33 (if the tapered pipe 24 has a cross section which is oval or circular) or sides 33 of the tapered pipe 24 at the inlet 38 of the tapered pipe 24 are connected to the water pan 35 around the aperture 36 in the water pan 35, and the inlet 38 of the tapered pipe 24 is below the exit 25 of the tapered pipe 24.

The cabinet 4 has a top vent 39, which is preferable adjustable, to permit the smoke to escape and adjustable side vents 40 to assist in controlling the rate of cooking.

The fluid communication of the steam tube 28 with the container 12 of the steam generator 2 is preferably achieved by having the steam tube 28 extend through a wall 41 of the cabinet 4 before having the proximal end 42 of the steam tube 28 connected with the pipe 13 from the container 12 of steam generator. This is preferably a releasable connection and is preferably accomplished with a traditional quick connect 43.

Figure 6:
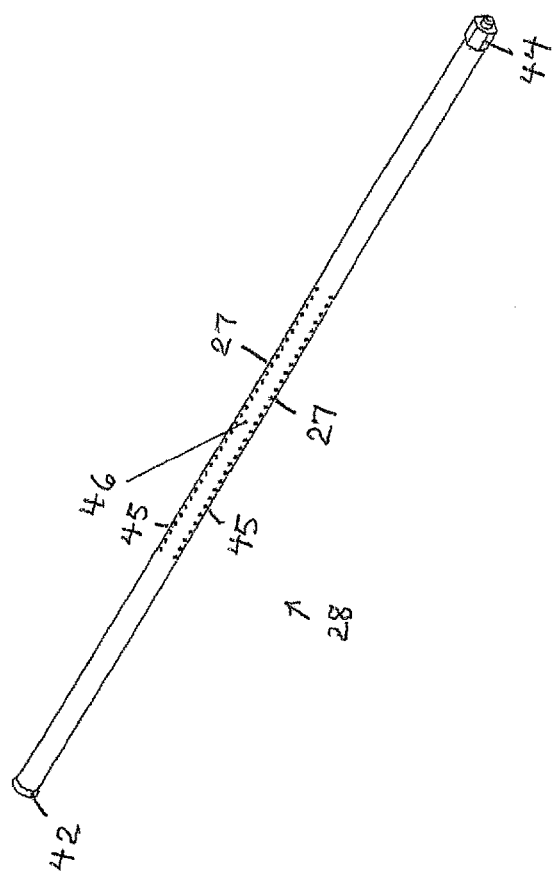
FIG. 6 is a perspective view of the steam tube.
Figure 7:
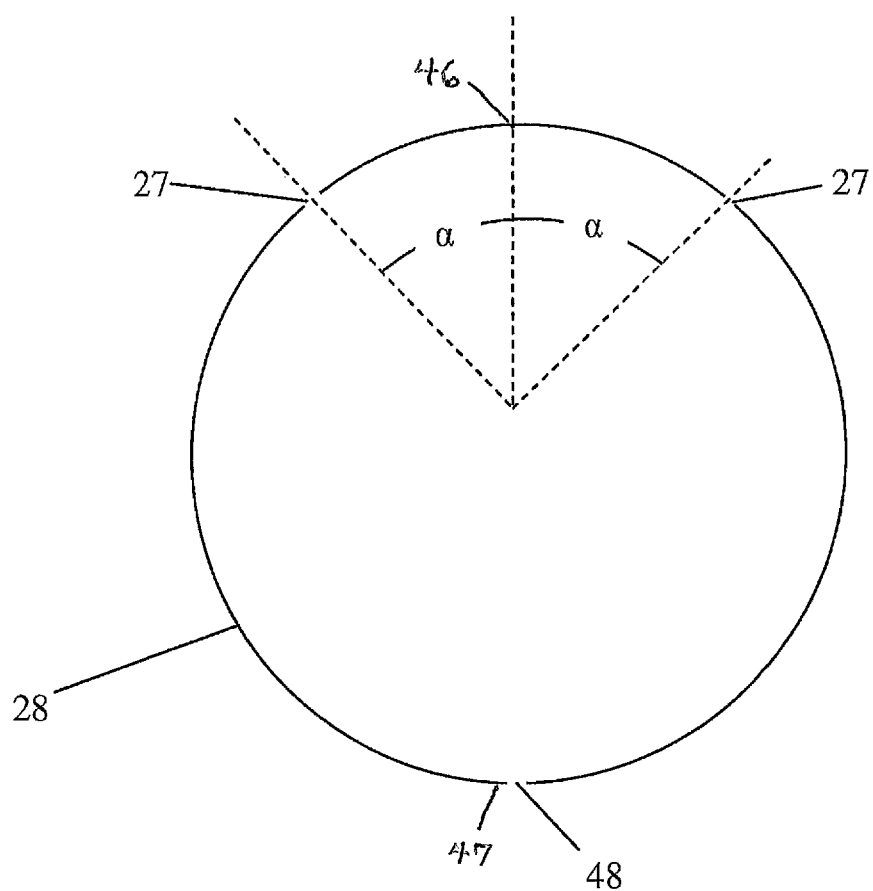
FIG. 7 depicts the angular relationship of the apertures in the steam tube with respect to the top of the steam tub.

The steam tube 28 preferably has a cylindrical shape and has its distal end 44 closed, as seen in FIG. 1 and FIG. 6; and the apertures 27 are preferably arranged, as portrayed in FIG. 6, in two parallel rows 45 with each row 45 located, as shown in FIG. 7, at an angle $\alpha$ of forty-five degrees with respect to the top 46 of the steam tube 28 and with each aperture 27 in each row 45 located at a different distance from the distal end 44 of the steam tube 28 and at substantially the same distance from the distal end 44 of the steam tube 28 as one aperture 27 in the other row 45. As mentioned above, however, the shape of the steam tube 28 can be any shape which allows the steam to escape from apertures 27 into the intended path of the smoke, preferably horizontally; upward; or at an angle between horizontal and vertical, inclusive. (It would also be acceptable to have the steam escaping at various angles and to have the angles as great as 180 degrees from upward, i.e., downward.)

Near the bottom 47 of the steam tube 28 is preferably located a drain aperture 48 for removing liquid which may collect in the steam tube 28 and interfere with expulsion of the steam. In the preferred cylindrical shape with the preferred parallel rows 45 of apertures 27, the drain aperture 48 is preferably located at the same distance from the distal end 44 of the steam tube 28 as is the aperture 27 in each of the rows 45 that is nearest to the distal end 44 of the steam tube 28.

Although each of the burners 16, 17 can be attached to a separate source of fuel, a fuel manifold 49 preferably connects, as depicted in FIG. 1, the burners 16, 17 so that they can be serviced with a single source of fuel.

And, of course, the cabinet 4 is openable to permit the introduction and removal of the product to be treated.

Furthermore, having both the reservoir 1 and the steam generator 2 separate from the cabinet 4 facilitates cleaning the cabinet 4 after use. When the reservoir 1 contains only water (and no additive to the water, such as flavoring), when the heat created by the burner 16 of the steam generator 2 is set for its maximum operating temperature, and when the burner 17 for creating the smoke in the cabinet 4 is turned to its off position, the steam will not be infused with any smoke and will penetrate the heavy levels of cooked-on food within the cabinet 4, thereby steam cleaning the cabinet 4 from the inside.

Having the reservoir 1 attached to the steam generator 2 with a traditional quick connect 8 and the steam generator 2 attached to the cabinet 4 with a "quick connect" facilitates easy and rapid assembly and disassembly of the Device for Cooking with Steam and Smoke.

And a desirable option makes the Device for Cooking with Steam and Smoke portable. In such an embodiment the reservoir 1, the steam generator 2, and the cabinet 4 are, as illustrated in FIG. 2, placed upon a cart 50.

Dimensions will vary dependent upon the size of the Device for Cooking with Steam and Smoke, but several principles will guide the selection of such dimensions sufficiently to enable one of ordinary skill in the field to make the necessary decisions. The reservoir 1 and the container 12 for the steam generator 2 are selected to be as large as is consistent with economics and portability (when that is a desired characteristic of the product incorporating the present invention). The inner diameter of the steam tube 28 is selected to achieve a desired pressure for forcing the steam through the apertures 27. The diameter of the inlet 38 for the tapered pipe 24 is selected to be of such a size as to capture the column of smoke which is produced by the burner 17 for the cabinet 4. The taper of the tapered pipe 24 and the diameter of the exit 25 for the tapered pipe 24 are selected so as to optimize the quantity and velocity of smoke passing through the tapered pipe 24, consistent with having the desired height for the cabinet. The fins 26 have such dimensions as to enable the fins 26 to contact and redirect the smoke coming from the exit 25 of the tapered pipe 24 so that such smoke rotates as it rises. The drain aperture 48 in the steam tube 28 is selected to remove liquid collecting in the steam tube while not impairing the ejection of the steam.

Figure 8:
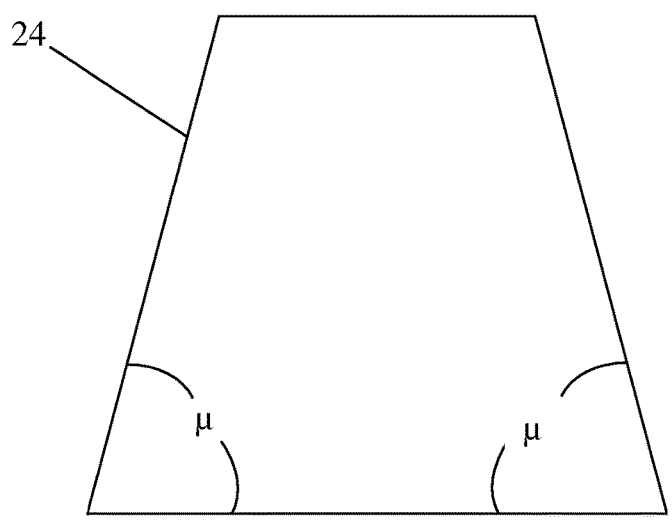
FIG. 8 clarifies the meaning of "the angle of taper" for the tapered pipe.

Using these guidelines, the inventors of the Device for Cooking with Steam and Smoke have determined that, in general an acceptable range for the angle of taper $\mu$, shown in FIG. 8, for the tapered pipe 24 is 10 degrees to 80 degrees and that the preferred such range is 40 degrees to forty-five degrees.

Figure 9:
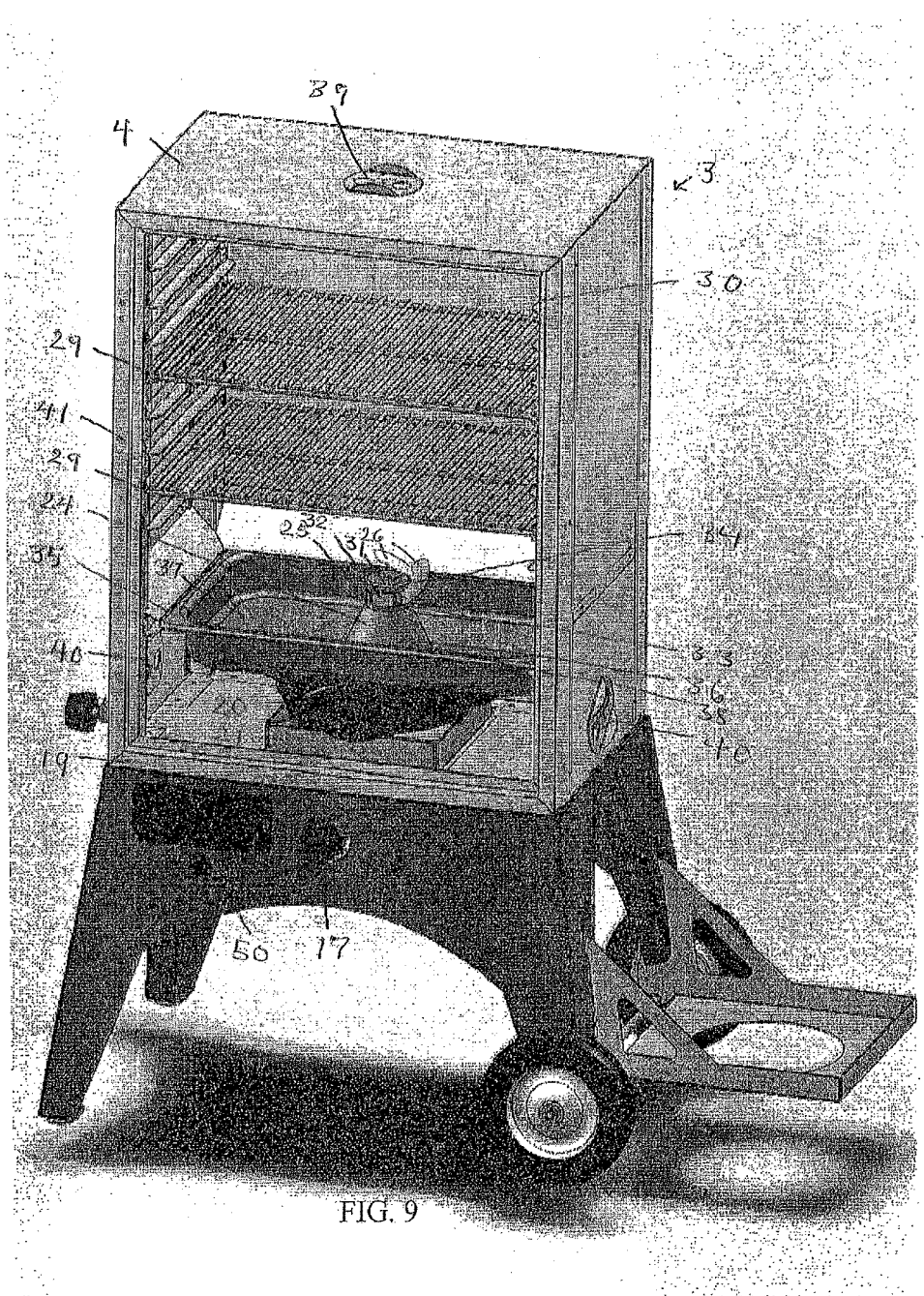
FIG. 9 is a perspective view of an alternate embodiment of the Device for Cooking with Steam and Smoke.
Figure 10:
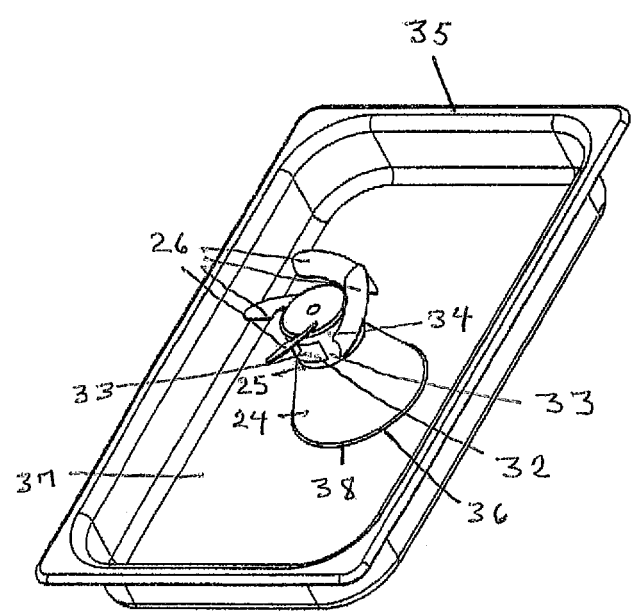
FIG. 10 is a perspective view of an enlarged water pan having the tapered pipe attached to it, which enlarged water pan is utilized in the alternate embodiment shown in FIG. 9.

Finally, an optional embodiment for the Device for Cooking with Steam and Smoke is illustrated in FIG. 9. This embodiment lacks the external reservoirs 1 and the external steam generator 2. The enlarged water pan 35, which is shown in FIG. 10 replaces the external reservoir 1, the external steam generator 2, and the steam tube 28. A liquid to be heated in order to create the desired steam is placed into the enlarged water pan 35. Besides creating the smoke in this optional embodiment, the heat from the burner 17 for the cabinet 4 also gradually transforms the liquid in the enlarged water pan 35 into the steam that combines with the smoke.

The materials and techniques used to construct either embodiment preferably conform to the guidelines for cooking equipment of the National Sanitary Foundation and the Canadian Standards Association.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

We claim:

1. A device for cooking with steam and smoke, which comprises:
   an openable cabinet having a bottom containing an aperture and also having an inside;
   an adjustable burner located below the aperture in the bottom of the openable cabinet;
   a container for a material to create smoke, such container being inside the cabinet above the aperture in the bottom of the cabinet;
   a water pan having a bottom with an aperture, such water pan being located above the container for a material to create smoke and extending across the entire inside of the cabinet;
   a tapered pipe having an inlet and an exit with the inlet being larger than the exit and with the inlet being connected to the water pan around the aperture in the water pan with the inlet of the tapered pipe being below the exit of the tapered pipe;
   one or more grates located horizontally in the cabinet, such one or more grates being attached to the inside of the cabinet above the water pan; and
   a top vent.

2. The device for cooking with steam and smoke as recited in claim 1, further comprising:
   a flat plate attached to the exit of the tapered pipe and wherein:
   the perimeter of the tapered pipe contains apertures.

3. The device for cooking with steam and smoke as recited in claim 2, further comprising:
   two or more fins attached to the exit of the tapered pipe and so located as to cause smoke to rotate as it rises from such exit.

4. The device for cooking with steam and smoke as recited in claim 1, further comprising:
   a flat plate attached to the exit of the tapered pipe and wherein:
   the perimeter of the tapered pipe contains apertures.

5. A device for cooking with steam and smoke, which comprises:
   an openable reservoir for holding a liquid for generating steam, said openable reservoir having a bottom;
   a steam generator which is physically separate from said openable reservoir, said steam generator comprising:
      a container in fluid communication with said openable reservoir, said container having a bottom which bottom is at substantially the same lever as the bottom of said openable reservoir; and
      an adjustable burner located below the container in order to provide heat for converting a liquid in the container into steam; and
   a treatment unit which is physically separate from said openable reservoir and from said steam generator, said treatment unit comprising:
      an openable cabinet having a bottom containing an aperture and also having an inside;
      an adjustable burner located below the aperture in the bottom of the openable cabinet;
      a container for a material to create smoke, such container being inside the cabinet above the aperture in the bottom of the cabinet;
      a water pan having a bottom with an aperture, such water pan being located above the container for a material to create smoke and extending across the entire inside of the cabinet;
      a tapered pipe having an inlet and an exit with the inlet being larger than the exit and with the inlet being connected to the water pan around the aperture in the water pan with the inlet of the tapered pipe being below the exit of the tapered pipe;
      a steam tube in fluid communication with the container of said steam generator, such steam tube being located above the exit of the tapered pipe and having apertures oriented to allow steam to escape from the apertures into the intended path of the smoke;
      one or more grates located horizontally in the cabinet, such one or more grates being attached to the inside of the cabinet above the steam tube; and
      a top vent.

6. The device for cooking with steam and smoke as recited in claim 5, further comprising:
   a drain aperture near the bottom of said steam tube.

7. The device for cooking with steam and smoke as recited in claim 5, wherein:
   the container of said steam generator is in fluid communication with said reservoir through a pipe connected to said steam generator near the bottom of the container of said steam generator which pipe is attached to a pipe connected to said reservoir near the bottom of said reservoir; and
   the steam tube is in fluid communication with the container of said steam generator by said steam tube extending through a wall of the cabinet and a proximal end of said steam tube connecting to a pipe connected to the container of said steam generator at a location higher than the highest intended level of liquid within the container.

8. The device for cooking with steam and smoke as recited in claim 7, further comprising:
   a drain aperture near the bottom of said steam tube.

9. The device for cooking with steam and smoke as recited in claim 7, wherein:
   the connection of the pipe from the container of said steam is attached to the pipe connected to said reservoir with a traditional quick connect.

10. The device for cooking with steam and smoke as recited in claim 9, further comprising:
    a drain aperture near the bottom of said steam tube.

11. The device for cooking with steam and smoke as recited in claim 5, further comprising:
    a flat plate attached to the exit of the tapered pipe and wherein:
    the perimeter of the tapered pipe contains apertures.

12. The device for cooking with steam and smoke as recited in claim 11, further comprising:
    a drain aperture near the bottom of said steam tube.

13. The device for cooking with steam and smoke as recited in claim 11, wherein:
    the container of said steam generator is in fluid communication with said reservoir through a pipe connected to said steam generator near the bottom of the container of said steam generator which pipe is attached to a pipe connected to said reservoir near the bottom of said reservoir; and
    the steam tube is in fluid communication with the container of said steam generator by said steam tube extending through a wall of the cabinet and a proximal end of said steam tube connecting to a pipe connected to the container of said steam generator at a location higher than the highest intended level of liquid within the container.

14. The device for cooking with steam and smoke as recited in claim 13, further comprising:
a drain aperture near the bottom of said steam tube.

15. The device for cooking with steam and smoke as recited in claim 13, wherein:
the connection of the pipe from the container of said steam is attached to the pipe connected to said reservoir with a traditional quick connect.

16. The device for cooking with steam and smoke as recited in claim 15, further comprising:
a drain aperture near the bottom of said steam tube.

17. The device for cooking with steam and smoke as recited in claim 11, further comprising:
two or more fins attached to the exit of the exit of the tapered pipe and so located as to cause smoke to rotate as it rises from the apertures in the perimeter of the tapered pipe.

18. The device for cooking with steam and smoke as recited in claim 17, further comprising:
a drain aperture near the bottom of said steam tube.

19. The device for cooking with steam and smoke as recited in claim 17, wherein:
the container of said steam generator is in fluid communication with said reservoir through a pipe connected to said steam generator near the bottom of the container of said steam generator which pipe is attached to a pipe connected to said reservoir near the bottom of said reservoir; and
the steam tube is in fluid communication with the container of said steam generator by said steam tube extending through a wall of the cabinet and a proximal end of said steam tube connecting to a pipe connected to the container of said steam generator at a location higher than the highest intended level of liquid within the container.

20. The device for cooking with steam and smoke as recited in claim 19, further comprising:
a drain aperture near the bottom of said steam tube.

21. The device for cooking with steam and smoke as recited in claim 19, wherein:
the connection of the pipe from the container of said steam is attached to the pipe connected to said reservoir with a traditional quick connect.

22. The device for cooking with steam and smoke as recited in claim 21, further comprising:
a drain aperture near the bottom of said steam tube.

23. The device for cooking with steam and smoke as recited in claim 5, further comprising:
two or more fins attached to the exit of the exit of the tapered pipe and so located as to cause smoke to rotate as it rises from such exit.

24. The device for cooking with steam and smoke as recited in claim 23, further comprising:
a drain aperture near the bottom of said steam tube.

25. The device for cooking with steam and smoke as recited in claim 23, wherein:
the container of said steam generator is in fluid communication with said reservoir through a pipe connected to said steam generator near the bottom of the container of said steam generator which pipe is attached to a pipe connected to said reservoir near the bottom of said reservoir; and
the steam tube is in fluid communication with the container of said steam generator by said steam tube extending through a wall of the cabinet and a proximal end of said steam tube connecting to a pipe connected to the container of said steam generator at a location higher than the highest intended level of liquid within the container.

26. The device for cooking with steam and smoke as recited in claim 25, further comprising:
a drain aperture near the bottom of said steam tube.

27. The device for cooking with steam and smoke as recited in claim 25, wherein:
the connection of the pipe from the container of said steam is attached to the pipe connected to said reservoir with a traditional quick connect.

28. The device for cooking with steam and smoke as recited in claim 27, further comprising:
a drain aperture near the bottom of said steam tube.

29. A device for cooking with steam and smoke, which comprises:
an openable reservoir for holding a liquid for generating steam, said openable reservoir having a bottom;
a pipe connected to said reservoir hear the bottom of said openable reservoir;
a steam generator which is physically separate from said openable reservoir, said steam generator comprising:
a container having a bottom which bottom is at substantially the same level as the bottom of said openable reservoir; and
an adjustable burner located below the container in order to provide heat for converting a liquid in the container into steam;
a pipe connected to said steam generator near the bottom of the container of said steam generator and also releasably attached to said pipe that is connected to said openable reservoir near the bottom of said openable reservoir; and
a treatment unit which is physically separate from said openable reservoir and from said steam generator, said treatment unit comprising:
an openable cabinet having a bottom containing an aperture and also having an inside;
an adjustable burner located below the aperture in the bottom of the openable cabinet;
a container for a material to create smoke, such container being inside the cabinet above the aperture in the bottom of the cabinet;
a water pan having a bottom with an aperture, such water pan being located above the container for a material to create smoke and extending across the entire inside of the cabinet;
a tapered pipe having an inlet, an exit, an upper end, a perimeter, and apertures in the perimeter near the upper end, with the inlet being larger than the exit and with the inlet being connected to the water pan around the aperture in the water pan and with the inlet of the tapered pipe being below the exit of the tapered pipe;
a flat plate attached to the exit of the tapered pipe;
two or more fins attached to the exit of the exit of the tapered pipe and so located as to cause smoke to rotate as it rises from the apertures in the perimeter of the tapered pipe;
a cylindrical steam tube having a proximal end extending through a wall of said cabinet, a closed distal end, a top, two parallel rows of apertures with each row located at an angle of forty-five degrees with respect to the top of said cylindrical steam tube and with each aperture in a given row located at a different distance from the distal end of the steam tube and at substantially the same distance from the distal end of the cylindrical steam tube as one aperture in the other row, and a drain aperture near the bottom of said cylindrical steam tube, the proximal end of said cylindrical steam tube being releasably attached to a pipe connected to the container of said steam generator at a location higher than the highest intended level of liquid with the container, such steam tube being located above the exit of the tapered pipe and having apertures oriented at an angle of forty-five degrees with respect to the top of said cylindrical steam tube to allow steam to escape from the apertures into the intended path of the smoke;

one or more grates located horizontally in the cabinet, such one or more grates being attached to the inside of the cabinet above the steam tube; and a top vent.

30. A device for cooking with steam and smoke, which comprises:

an open reservoir for holding a liquid for generating steam, said open reservoir having a bottom;

a pipe connected to said reservoir hear the bottom of said open reservoir;

a steam generator which is physically separate from said open reservoir, said steam generator comprising:

a container having a bottom which bottom is at substantially the same level as the bottom of said open reservoir; and an adjustable burner located below the container in order to provide heat for converting a liquid in the container into steam;

a pipe connected to said steam generator near the bottom of the container of said steam generator and also releasably attached to said pipe that is connected to said open reservoir near the bottom of said open reservoir; and a treatment unit which is physically separate from said open reservoir and from said steam generator, said treatment unit comprising:

an openable cabinet having a bottom containing an aperture and also having an inside;

an adjustable burner located below the aperture in the bottom of the openable cabinet;

a container for a material to create smoke, such container being inside the cabinet above the aperture in the bottom of the cabinet;

a water pan having a bottom with an aperture, such water pan being located above the container for a material to create smoke and extending across the entire inside of the cabinet;

a tapered pipe having an inlet, an exit, an upper end, a perimeter, and apertures in the perimeter near the upper end, with the inlet being larger than the exit and with the inlet being connected to the water pan around the aperture in the water pan and with the inlet of the tapered pipe being below the exit of the tapered pipe;

a flat plate attached to the exit of the tapered pipe;

two or more fins attached to the exit of the exit of the tapered pipe and so located as to cause smoke to rotate as it rises from the apertures in the perimeter of the tapered pipe;

a cylindrical steam tube having a proximal end extending through a wall of said cabinet, a closed distal end, a top, two parallel rows of apertures with each row located at an angle of forty-five degrees with respect to the top of said cylindrical steam tube and with each aperture in a given row located at a different distance from the distal end of the steam tube and at substantially the same distance from the distal end of the cylindrical steam tube as one aperture in the other row, and a drain aperture near the bottom of said cylindrical steam tube, the proximal end of said cylindrical steam tube being releasably attached to a pipe connected to the container of said steam generator at a location higher than the highest intended level of liquid with the container, such steam tube being located above the exit of the tapered pipe and having apertures oriented at an angle of forty-five degrees with respect to the top of said cylindrical steam tube to allow steam to escape from the apertures into the intended path of the smoke;

one or more grates located horizontally in the cabinet, such one or more grates being attached to the inside of the cabinet above the steam tube; and a top vent.

* * * * *